March 17, 1959  S. A. HOSHOWSKY  2,877,605
PROCESSING OF ELECTRON TUBES CONTAINING LUMINESCENT SCREENS
Filed July 15, 1955
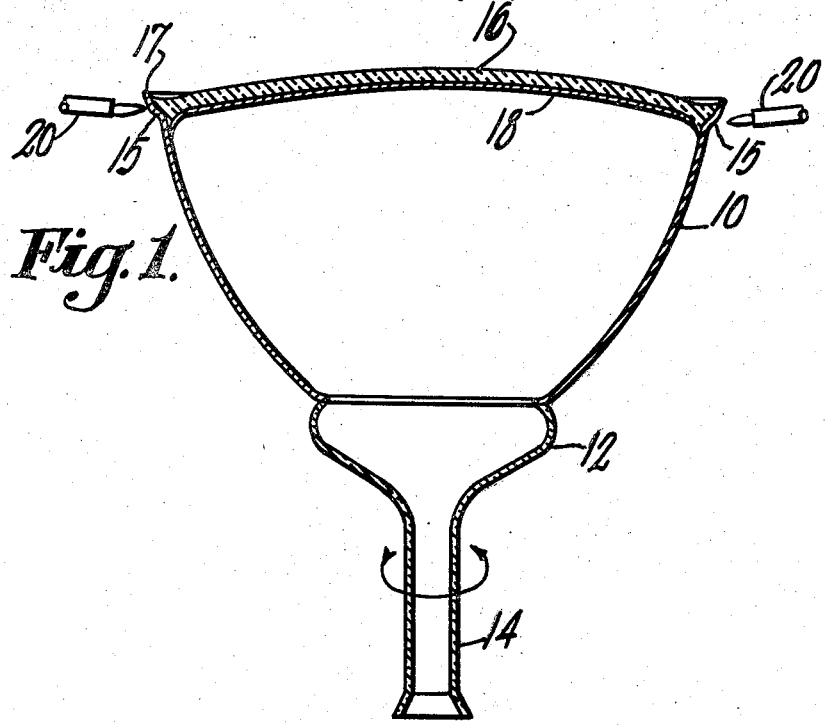
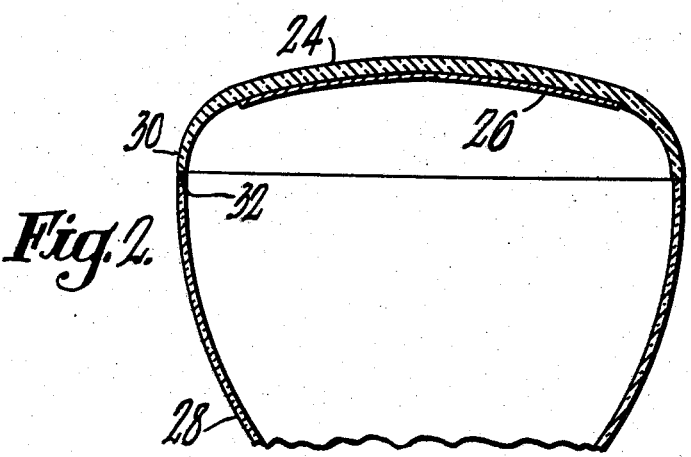
INVENTOR.
Stanley A. Hoshowsky
BY
William A. Zalesak
ATTORNEY

2,877,605

PROCESSING OF ELECTRON TUBES CONTAINING LUMINESCENT SCREENS

Stanley A. Hoshowsky, East Petersburg, Pa., assignor to Radio Corporation of America, a corporation of Delaware Application July 15, 1955, Serial No. 522,298

3 Claims. (Cl. 49—78)

The invention is directed to the fabrication of an envelope for a discharge device and specifically to the sealing of a pre-screened face plate to a cathode ray tube envelope.

A cathode ray tube normally comprises a large bulbous envelope having a large end wall or face plate, on the inner surface of which is formed a phosphor screen. The phosphor luminesces under electron bombardment and during tube operation provides a viewing screen which is visible to the observer through the transparent wall of the face plate. The tube envelope includes a relatively small tubular neck portion attached to a small opening of the tube bulb at the opposite end from the face plate. The electron gun of the tube is mounted within the neck portion prior to the evacuation and sealing of the tube envelope. Such cathode ray tube envelopes may be formed with either glass or metal bulb portions.

In the fabrication of cathode ray tubes, the envelope parts are usually first joined together to form the completed envelope and only the outer end of the tubular neck is left open. The phosphor screen is formed by introducing an aqueous suspension of the phosphor into the envelope through a funnel inserted into the neck while the tube is positioned with the neck upwardly. The phosphor is permitted to settle from the suspension onto the face plate for a relatively long period of time in the order of 30 minutes to one hour. This amount of time for screening the cathode ray tube is unduly long and does not lend itself to mass production of cathode ray tubes. It has been recognized for some time that, if the face plate of the tube could be screened or coated with a phosphor film prior to the fabrication of the tube envelope, much more rapid methods of screening could be used and which would be adaptable to mass production.

It is also well recognized that the phosphor materials used in screening cathode ray tubes are damaged at the high temperatures required for sealing the glass face plate to the other envelope portions. When standard monochrome television tube phosphors have been heated to high temperatures in the order of 800° C. and then cooled, there is a change in the color of the luminescence of the phosphor as well as a definite lessening of the efficiency or brightness of the phosphor. Because of the damage done by exposing phosphors to high temperature, the use of face plates which have been pre-screened prior to their sealing to other envelope portions has been precluded.

It is therefore an object of this invention to provide a method of sealing a pre-screened face plate to envelope portions to form a tube envelope.

It is also an object of this invention to fabricate a tube envelope having a phosphor screen.

It is another object of this invention to seal a phosphor-coated face plate to envelope portions by high temperature sealing without destroying the luminescence of the phosphor screen.

In accordance with this invention a cathode ray tube envelope is fabricated from a pre-screened face plate. To prevent the phosphor coating from becoming damaged during the sealing of the face plate to the other envelope portions, the coated face plate is dipped into a boric acid solution and thoroughly wet by the solution. The wet screen is dried and the face plate sealed to the bulb portion of the envelope in a normal manner.

Figure 1 schematically shows envelope portions of a cathode ray tube utilizing a pre-screened face plate in accordance with this invention.

Figure 2 is a sectional view of a tube of different design than that of Figure 1 and fabricated from a pre-screened face plate, in accordance with this invention.

Figure 1 schematically shows portions of one design of a tube envelope which are assembled to form a cathode ray tube. The envelope comprises a large metal bulbous portion 10 which may be in the form of a truncated pyramid or a truncated cone depending upon whether the tube utilizes a rectangular or spherical face plate. The smaller end of the bulb 10 is closed by having sealed thereto a glass funnel 12 and tubular neck portion 14 in the manner shown in Figure 1. To the large opening of bulb 10 there is sealed a glass face plate 16. Plate 16 is substantially flat but conforms essentially to a section of a spherical surface having a large radius of curvature. Cone 10 has a flange or sealing land 15 and rim 17, as shown in Figure 1.

Normally, after plate 16 has been sealed to the large open end of shell 10, a phosphor coating 18 is formed on the inner surface of plate 16. The envelope is then placed with neck 14 upright and an aqueous suspension of phosphor material is poured through the neck to completely cover the surface of plate 16 to a substantial depth. Phosphor particles settle out of the suspension by gravity to form a thin uniform coating of phosphor on the surface of plate 16. The supernatant liquid is poured off and the phosphor film dried to form the screen 18. This method of screening requires a substantial time for the phosphor settling, in the order of 30 minutes to one hour.

Also, in certain types of tubes for color television, a plurality of phosphors must be put down on the face plate in a specific arrangement or sequence. The screening of the face plate in these tubes requires accurate positioning of a masking electrode at a closely spaced distance from the screen surface several times during the screening procedure. This necessitates complete access to the inner surface of the face plate before the face plate is joined to form the tube envelope. A particular envelope design must be used as well as a low temperature sealing or welding of envelope parts together so as not to destroy the pre-screened phosphor coatings.

As pointed out above, definite advantages are obtained if the phosphor coating 18 can be formed on the surface of plate 16 prior to sealing the plate to the metal shell 10. A pre-screened face plate lends itself in several ways to rapid mass production techniques which are desirable in the cathode ray tube industry. Such techniques could include painting, spraying, dusting or printing phosphor coating on the open face plate.

However, the high temperatures used in sealing the face plate of a tube to the other envelope portions are detrimental to some of the phosphors presently used in cathode ray tubes. The temperature of sealing glass to glass or glass to metal is in the range of 1000° C. Normally, temperatures above 400° C. result in a lowering of the luminescence of the phosphor screen, such as the phosphor coated face plate 16. After sealing a pre-screened face plate 16 into a shell similar to that shown at 10 in Figure 1, it has been found that a large area of the phosphor near the sealing edge or the periphery of the pre-screened face plate has low luminescent efficiency.

In accordance with the invention, face plate 16 is coated with a phosphor coating before it is sealed into the shell 10. The coating may be accomplished in any desired manner, such as depositing the phosphor material from a suspension of the phosphor formed over the plate 16, as described. Also, other more rapid methods are available such as painting on the phosphor, dusting the phosphor onto a sticky binder coating on plate 18, or by forming a phosphor film by centrifuging or spinning a slurry of phosphor and binder. These latter methods lend themselves to mass production of phosphor screened face plates.

To protect the phosphor from damage during the sealing of the face plate 16 into the envelope, the phosphor coated plate 16 is dipped briefly for a period of time in the order of less than a minute into a 15% aqueous boric acid solution. When the screen has then been thoroughly wetted, the face plate is then removed and the wet screen is air dried. In this condition the face plate can be safely sealed to the metal envelope 10.

The metal cone 10 is positioned for the sealing operation with flange 15 presented upwardly and face plate 12 is centered on the cone-shaped sealing land. The assembly is rotated about its axis and subjected to pre-heating fires. When the glass is above 250° C., the sealing operation is started. The face plate seal to the sealing land is preferably made by heating the under side of land 15 to a temperature of about 1000° to 1200° C., preferably close to 1200° C., with sealing fires from burners 20. The glass is allowed to flow out to lip 17 covering the sealing land. Simultaneously the face plate beyond the immediate sealing area is maintained at a temperature ranging between 530° C. and 630° C. and preferably close to 550° C., that is, a temperature just above annealing temperature of the glass so that all stresses are removed from the face plate during the sealing operation.

On completion of the sealing operation, the assembly is allowed to reach equilibrium at a temperature of about 525° C. to 575° C., preferably close to 550° C. At the latter temperature stress relief and temperature equilibrium is completed in the exceedingly short time of five minutes and the assembly may then be left to cool down in air at room temperature.

The phosphor material used in the screen coating 18 of a black and white television kinescope may be a blend of two phosphor materials such as a blue emitting zinc sulfide activated with silver and a yellow emitting zinc cadmium sulfide activated with silver. The two materials are blended in the desired portions to provide a white luminescence when bombarded with high velocity electrons. The phosphors used in making color television screens may comprise green emitting zinc silicate, red emitting zinc phosphate and blue emitting zinc sulfide. Of these three, the zinc sulfide must be protected at high temperatures. In general, any phosphor may be protected provided protection from the atmosphere is required at high temperatures. Other examples of such phosphors are red emitting zinc selenide and the copper activated zinc sulfide and zinc cadmium sulfide.

The boric acid solution into which the phosphor screen is dipped is a 15% aqueous solution as set forth above. The temperature of the solution is maintained at about 75° C. in order to keep the boric acid in solution. The concentration of the boric acid solution, however, is not critical. A range of 12% to 25% solution gives ample protection to the phosphor. At high concentrations, however, around 25%, the temperature of the solution must be kept near boiling to prevent the boric acid from crystallizing out of solution. At concentrations of boric acid in the range of 1 to 12%, the phosphor screen is not completely protected from the high sealing temperatures, although progressively more protection is obtained as the concentration is increased.

Solvents other than water may be used for solutions of boric acid. For example, the solubility of boric acid is greater in the organic alcohols, methyl and ethyl, than in water at room temperature. Thus, if a solution is preferred at room temperature instead of a hot aqueous solution, methyl alcohol solvent can be used in which boric acid dissolves easily up to 25% at room temperature.

It is not entirely clear what function the boric acid coating plays during the sealing of the face plate to the other envelope parts. However, it is believed that the boric acid treatment does prevent deterioration of the phosphor at high temperatures in the following manner. The phosphor screen, which consists of layers of fine particles, is thoroughly wet by the solution, and upon drying, the boric acid remains deposited on each phosphor particle. During sealing, when the screen face plate is heated to the high sealing temperatures, the boric acid decomposes and loses water at about 185° C., forming boric oxide. The boric oxide, thus formed at high temperature, is a glass-like material, and it is assumed that each phosphor particle is coated with a glass-like film which prevents oxidation of the phosphor at high temperatures. It is also thought that this boric oxide coating prevents or reduces the interaction of the blue and yellow components of the white phosphor so that the color of luminescence of the white phosphor blend remains constant.

The invention has been described as utilizing a method of dipping the coated face plate into a solution of boric acid. It is possible, however, to thoroughly wet the phosphor screen by other methods of application such as spraying, painting on the solution, etc. Also, a separate baking step, around 200° C., may be utilized to decompose the boric acid solution and to form the protective boric oxide coating. Sealing of the tube parts can be done at any subsequent time.

Figure 2 discloses portions of a glass bulb 22 which may also be fabricated in accordance with the invention. The bulb includes a cap portion 24 having on the inner surface thereof a phosphor screen 26. To form the envelope, cap 24 is joined to a glass bulb portion 28 by sealing the peripheral edge 30 of the cap to a matching edge 32 of the bulb portion. In accordance with the invention, the cap 24 may be pre-screened before sealing and the phosphor screen protected from the high temperature sealing fires by thoroughly wetting the screen with the boric acid solution, as described above.

What is claimed is:

1. The method of sealing a glass plate member to a bulb structure having an open end, said glass plate member having a phosphor coating on one surface surface thereof and adjacent to the peripheral edge of said plate, said method comprising the steps of, wetting the phosphor coating with 12% to 25% solution of boric acid, heating the peripheral portion of said plate member to the sealing temperature of the glass of said plate to form a seal between said plate and the contacting portions of said bulb, cooling said plate and bulb to ambient temperature.

2. The method of sealing a glass plate member to a bulb structure having an open end, said glass plate member having a phosphor coating on one surface thereof and adjacent to the peripheral edge of said plate, said method comprising the steps of, wetting the phosphor coating with 12% to 25% solution of boric acid, drying said phosphor surface, heating the peripheral portion of said plate member to the sealing temperature of the glass of said plate to form a seal between said plate and the contacting portions of said bulb, cooling said plate and bulb to ambient temperature.

3. The method of sealing a glass plate member to a bulb structure having an open end, said glass plate member having a phosphor coating on one surface thereof and adjacent to the peripheral edge of said plate, said method comprising the steps of, wetting the phosphor coating with 12% to 25% solution of boric acid, baking said coated plate member around 200° C. to decompose said boric acid to boric oxide, heating the peripheral portion of said plate member to sealing temperature to form a seal between said plate and the contacting portions of said bulb, cooling said plate and bulb to ambient temperature.

References Cited in the file of this patent

UNITED STATES PATENTS

| | | |
|---|---|---|
| 2,123,957 | Orth | July 19, 1938 |
| 2,233,786 | Law | Mar. 4, 1941 |
| 2,298,968 | Roberts et al. | Oct. 13, 1942 |
| 2,514,878 | Kuperus | July 11, 1950 |
| 2,689,190 | Hushley | Sept. 14, 1954 |
| 2,697,310 | Faulkner | Dec. 21, 1954 |